June 5, 1923.
E. S. HEURTLEY
1,458,098
METHOD OR MEANS FOR AMPLIFYING OR OTHERWISE INDICATING SMALL MECHANICAL EFFECTS
Filed April 11, 1919
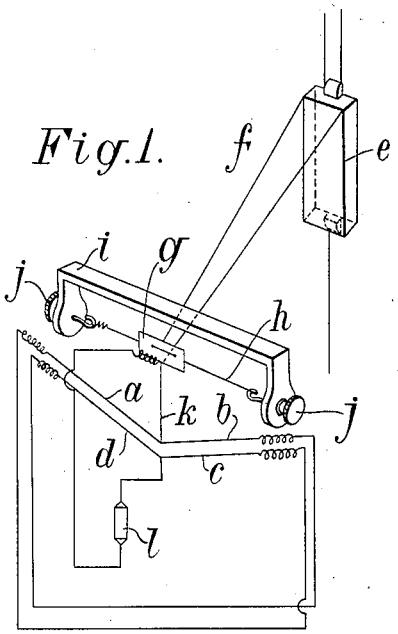
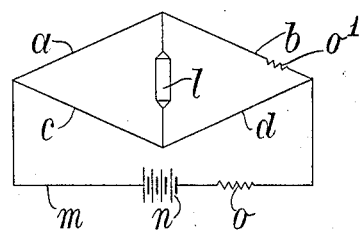
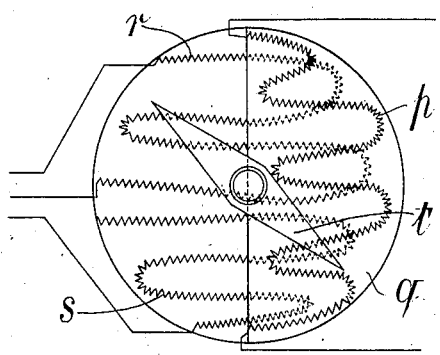
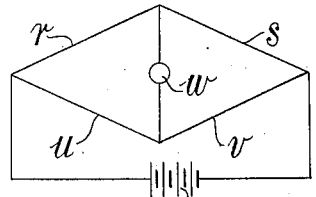
INVENTOR,
Ernest S. Heurtley,
BY C. G. Siggers,
ATTORNEY.

Patented June 5, 1923.

1,458,098

UNITED STATES PATENT OFFICE.

ERNEST SYDNEY HEURTLEY, OF LONDON, ENGLAND.

METHOD OR MEANS FOR AMPLIFYING OR OTHERWISE INDICATING SMALL MECHANICAL EFFECTS.

Application filed April 11, 1919. Serial No. 289,337.

*To all whom it may concern:*

Be it known that I, ERNEST SYDNEY HEURTLEY, a subject of His Majesty the King of England, and resident of Great Winchester Street, in the city of London, Kingdom of England, have invented a certain new and useful Method or Means for Amplifying or Otherwise Indicating Small Mechanical Effects, of which the following is a specification.

The object of this invention is to provide an improved method or means for magnifying, relaying, reproducing or otherwise indicating small movements, such for instance as those of the recorder at the end of a submarine cable.

According to the present invention the method consists in causing these movements to vary the relative position of current heated wires or other electrical conductors so as to cause a variation in the temperature and consequently in the resistance of the said wires. Thus, when any two wires approach each other they radiate less heat and consequently their temperature rises and their resistance increases, and on separating they radiate more heat and become cooler, thus reducing their resistance.

These changes in resistance take place in both sets of current heated conductors or wires and not only in those which are subject to this relative movement, one set of which conductors or wires may be stationary, causing a double change in the difference of potential across the receiving instrument and the current through it due to the change.

The current heated conductors or wires may be conveniently arranged to form two or more arms of a Wheatstone bridge system and so connected up that their changes of resistance affect the receiving instrument in an additive or cumulative way.

The invention may also be employed to indicate variations in the position of a compass needle or other pointer when the latter, for any reason, is not directly or readily visible, or not in a convenient position.

In order that the invention may be clearly understood, reference is made to the accompanying drawing, but I desire it to be understood that I do not limit myself to the arrangements and electrical connections described and illustrated.

Figure 1 is a perspective view of an arrangement in accordance with the present invention.

Figure 2 is a diagrammatic illustration wherein the current heated conductors or wires are electrically connected to form the arms of a Wheatstone bridge system.

Figure 3 is a diagrammatic illustration of the application of the invention to a compass needle from which its general application to pointer and like instruments will be clearly understood.

Figure 4 is a diagrammatic illustration showing the current heated conductors or wires of Figure 3 connected in accordance with the Wheatstone bridge system.

Referring to Figure 1, which shows the application of the invention to the magnification of small electrical impulses such as those received at the end of a long submarine cable, $a$, $b$, $c$, $d$, indicate four current heated conductors of electricity of high temperature coefficients for change of resistance with change of temperature forming two sets of current heated conductors or wires, either set or both sets of which may be displaced by the movements of a prime mover such as a recorder coil $e$. In Figure 1, only one set of current heated conductors or wires, viz. $a$, $b$ are actually moved by the prime mover which is connected by a pair of fibres $f$ to a cradle $g$ suspended on a wire $h$. The wire $h$ is supported by a frame $i$ and the tension of the wire can be adjusted by the screws $j$ to which the wire $h$ is connected, a spring or springs being preferably interposed between one end or both ends of the wire $h$ and one of the screws $j$ or both screws. The cradle $g$ is mechanically connected to the current heated conductors $a$, $b$ by a wire $k$ in a glass tube or other support, so that the movements of the recorder coil $e$ are transmitted to the current heated conductors $a$, $b$. The second pair of current heated conductors $d$, $c$ are mounted on adjustable stands (not shown) so that their relative position to the wires $a$ and $b$ when the latter are at rest, can be adjusted. When in adjustment, the positions of the current heated conductors $d$ and $c$ are so placed by their adjustable mountings that a movement of the wires $a$, $b$, due to a movement of the coil $e$ transmitted through the support $k$, say outwards, will cause the conductors $a$ and *d* to come in closer proximity to each other while the relative position of the conductors *b* and *c* will be further apart. On the other hand, a movement of the current heated conductors *a, b* inwards will cause *a* and *d* to recede from each other while *b* and *c* approach each other. Consequently on a movement outwards of the current heated conductors *a, b*, as *a* and *d* approach each other they will radiate less heat and become hotter, and therefore of higher resistance, *b* and *c* will on the other hand radiate more heat, due to their being further apart and they will thus become cooler, which will lower their resistance, assuming in both cases positive temperature coefficients for the current heated conductors. These changes in resistance take place not only in the movable wires but also in the stationary wires, causing a double change in the difference of potentionl across a receiving instrument *l* inserted as shown in Figure 2.

The four conductors *a, b, c, d* may be conveniently arranged to form the four arms of a Wheatstone bridge system connected up as shown in Figure 2 so that their changes of resistance affect the receiving instrument *l* in an additive or cumulative manner. *m* indicates a local circuit having a source of electric energy *n* and an adjustable resistance *o* for electrically heating the conductors *a, b, c, d*. The positions of the conductors *a, b, c, d*, in Figures 1 and 2 relatively to each other would be such that as *a* and *d* approach each other, *b* and *c* recede from each other. One or more than one adjustable resistance as shown at O' in Figure 2 may be inserted in order to obtain a balance for the zero position of *a, b*.

Any other of the well known methods of connecting up the current heated conductors may be used, so as to affect the receiving instrument and a plurality of these instruments may be joined in series or parallel so as to increase the magnifying or amplifying effect.

The invention may also be used to reproduce the movements of any desired pointer such as a compass needle or to indicate variations in the position thereof, more especially when such pointer or needle for any reason is not directly or readily visible or not in a convenient position.

As an example of the aforesaid use of the present invention reference is made to Figure 3 which illustrates diagrammatically a compass needle the movements of which are to be magnified, reproduced or indicated at some remote point. The electrical connections for this form of the invention are shown in Figure 4.

A current heated element *p* is attached to half the compass card *q*. The element *p* moves in close proximity to two resistance elements *r, s*, which have preferably a high temperature coefficient for change of resistance in which the current may be of sufficient intensity to heat the said resistance, and which may form two adjacent arms of a Wheatstone bridge system, as in Figure 4.

The current heated element *p* is sufficiently close to the resistance elements *r, s* to raise the temperature of that part of the resistance elements which is closest to the heating element.

For explanatory purposes assume that at the normal or zero position of the needle *t*, the semi-circular part of the disc *q* which carries the heating element *p* is above, or in close proximity to, equal portions of the two resistance elements *r, s*. On rotation of the disc *q* clockwise, the heating element *p* will cover or be in close proximity to a larger proportion of the resistance element *s* than to the other resistance element *r*. This will cause a rise in the average temperature of the first mentioned element, and a fall in that of the other element resulting in an increase in the resistance of the first and a corresponding fall in the second and the amount of this rise and fall will be proportional to the angular movement of the heating element *p* and will be in the reverse direction if the movement is anti-clockwise in place of clockwise.

The connections may be made in a Wheatstone bridge system in which the two resistance elements *r, s* form two adjacent arms of the bridge system as in Figure 4. Two fixed resistances *u, v* adjustable or otherwise, form the other two arms of the bridge, the indicating instrument *w* or instruments being in the nul circuit. The fixed arms *u, v* may be made of material of such temperature coefficient that any error in the reading of the instrument *w* or instruments due to atmospheric changes of temperature will affect those arms as well as the resistance element *r, s*, in such a way as to tend to neutralize this error.

Formally the two fixed arms *u, v* would be adjusted so that when the needle *t* is in its zero position there is no current passing through the instrument *w* or instruments.

In practice the said needle *t*, heating element *p*, and resistances *r* and *s* would be in the submerged container or other inaccessible place and leads would be taken from this through a flexible cable and connected up as shown in Figure 4 to resistances *r* and *s* in instrument *w* and source of E. M. F., *x*.

If the axis of the needle *t* be kept in a horizontal position, then the instrument *w* would register any change in the dip of the needle; whereas if the axis of the needle *t* were in a vertical position, it would register any deviation from a north or south position.

It is obvious that relative variations in the arms will upset the bridge balance and cause currents to flow through the instrument or instruments which may be joined in parallel or series.

The invention may also be used for the transmission and multiplication of the movements of a pointer or needle to a plurality of instruments which may be remote from the original pointer or needle instrument.

This method of indicating the position of a compass needle or pointer may be used to operate several instruments at various localities, such for instance as indicating the reading of a standard compass at various parts of a ship.

It will be seen that the above described method covers the magnification, reproduction, relaying and indicating of small movements by causing such movements to vary the relative position of current heated conductors or wires, thus causing a variation in the amount of heat radiated, and in this connection a plurality of wires or conductors may be used, which conductors or wires form part of the circuit of the local receiver or receivers, in such a way that their temperature and consequently their resistance varies due to their change of position.

It also covers means for reproducing or indicating the position of a pointer by causing the movement of the pointer to alter the average temperature and consequently the average resistance of heated wires or filaments which have a temperature coefficient for change of resistance with change of temperature. The use of a current heated element to cause such change in the resistance by the pointer causing an alteration in the relative position of the wires or filaments and the heating elements, is also comprised in the present invention.

I also attach importance to the use of current heated resistances having temperature coefficients for change of resistance with change of temperature and forming part of the circuit of the indicating instrument or instruments, the said resistances being made to approach or recede from each other by movements of the pointer, and thus cause a variation in their temperature.

What I claim is:—

1. Means for indicating or magnifying small movements comprising a current heated conductor, a plurality of juxtaposed electrically conductive wires and means to cause relative movement between the said conductors so as to vary their temperature and consequently the resistance of the conductors, such variation in resistance causing variations in current flowing through a local circuit.

2. Means for indicating or magnifying small movements comprising a plurality of current-heated conductors, a plurality of juxtaposed electrically conductive wires, and means to cause relative movement between the said conductors so as to vary their temperature and consequently the resistance of the conductors, such variation in resistance causing variations in current flowing through a local circuit.

3. Means for indicating or magnifying small movements comprising a current heated conductor, a plurality of juxtaposed electrically conductive wires, and means to vary the relative positions of the conductors so as to produce a difference of potential across a receiving instrument in an additive or cumulative manner.

4. Means for indicating or magnifying small movements comprising a plurality of current-heated conductors, a plurality of juxtaposed electrically conductive wires, and means to cause relative movement between the said conductors so as to produce a difference of potential across a receiving instrument in an additive or cumulative manner.

5. Means for indicating or magnifying small movements comprising a pointer and an assemblage of wires having a high temperature resistance coefficient, a second assemblage of wires, and a mechanical connection between the pointer and one such assemblage of wires whereby one set of wires may be displaced with respect to the other set of wires.

6. Means in accordance with claim 5, including a current-heated element adapted by reason of its movement to effect changes in the resistance of an assemblage of wires by the movements of the pointer causing an alteration in the relative position of the said assemblage of wires and the current-heated element.

7. Means for indicating small movements comprising a pointer adapted to carry a resistance wire having a high temperature coefficient, the said resistance being included in the circuit of an indicating instrument and movable relatively to an assemblage of resistances so that relative motion between the resistances tends to neutralize errors due to change of temperature of the medium in which the apparatus is immersed.

8. Means for magnifying or otherwise indicating small movements, comprising two conductors supported in proximity to each other, means for heating one, at least, of said conductors, and means whereby to cause the mechanical effects to vary the distance between said conductors to cause the variation in the temperature and resistance of said conductors.

9. Apparatus for magnifying or otherwise indicating small movements, comprising two sets of conductors supported in proximity to each other, and means for heating one set of conductors with the conductors arranged so that plus variations of the distance between the conductors of one set is accompanied by minus variations of the distance between the conductors of the other set.

10. Apparatus as set forth in claim 9 having the conductors arranged as the arms of a Wheatstone bridge.

11. Apparatus as set forth in claim 8 in which the heating means comprises an electric circuit including a source of electric energy and the conductor to be heated.

12. Apparatus for magnifying or otherwise indicating small movements comprising two sets of conductors so arranged that plus variations of the distance between the conductors of one set is accompanied by minus variations of the distance between the conductors of the other set and said conductors being arranged as the arms of a Wheatstone bridge and the heating means for the conductors comprising an electric circuit including a source of electric energy and the arms of the Wheatstone bridge.

In testimony whereof I have hereunto signed my name.

E. S. HEURTLEY.